March 26, 1940.　　　D. E. KIMBALL　　　2,195,175
EYE PROTECTOR
Filed May 18, 1937　　　2 Sheets-Sheet 2
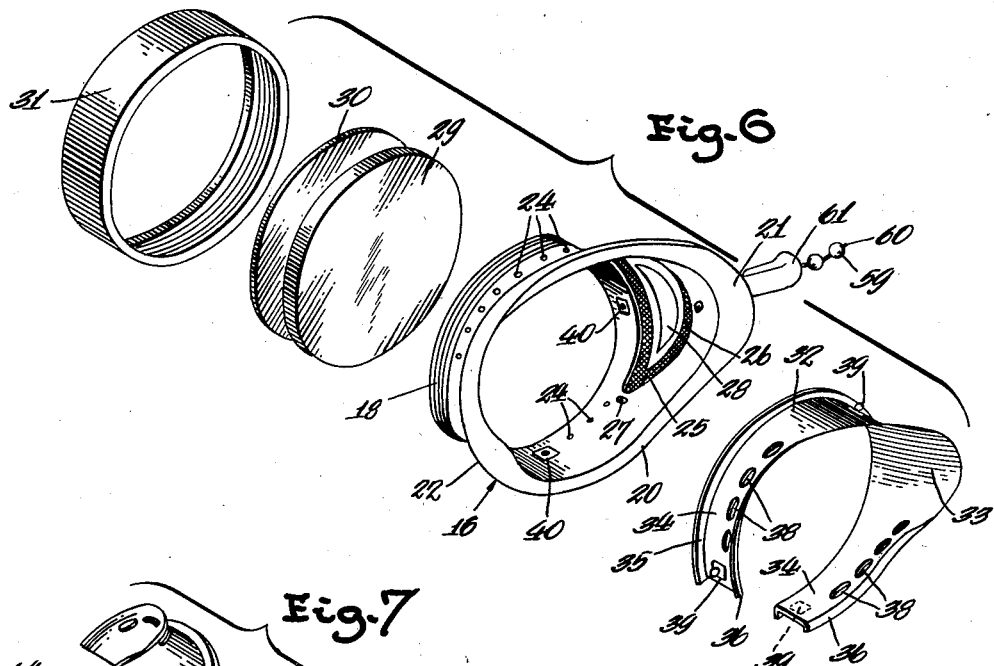
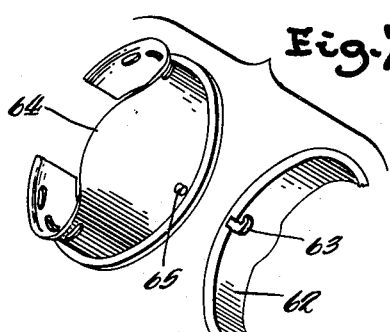
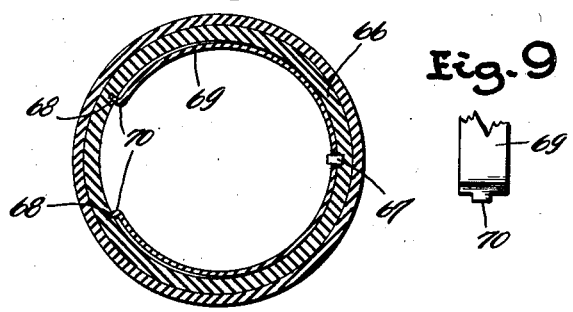
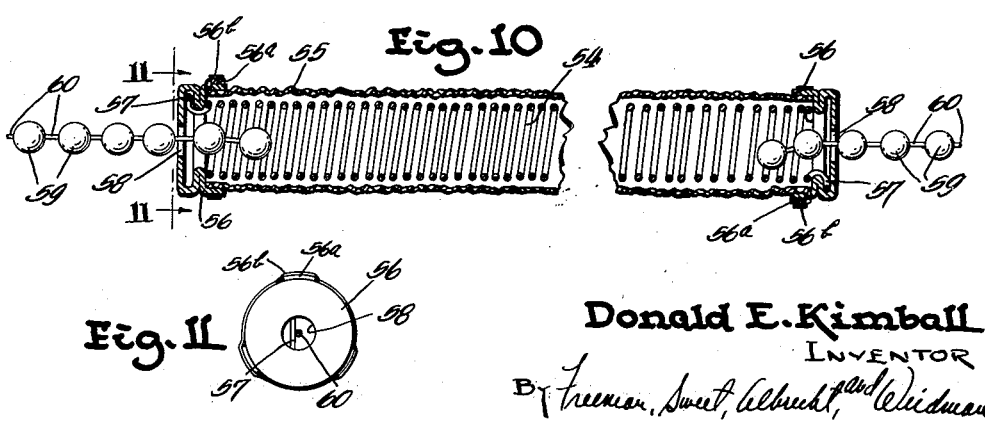
Donald E. Kimball
INVENTOR Patented Mar. 26, 1940

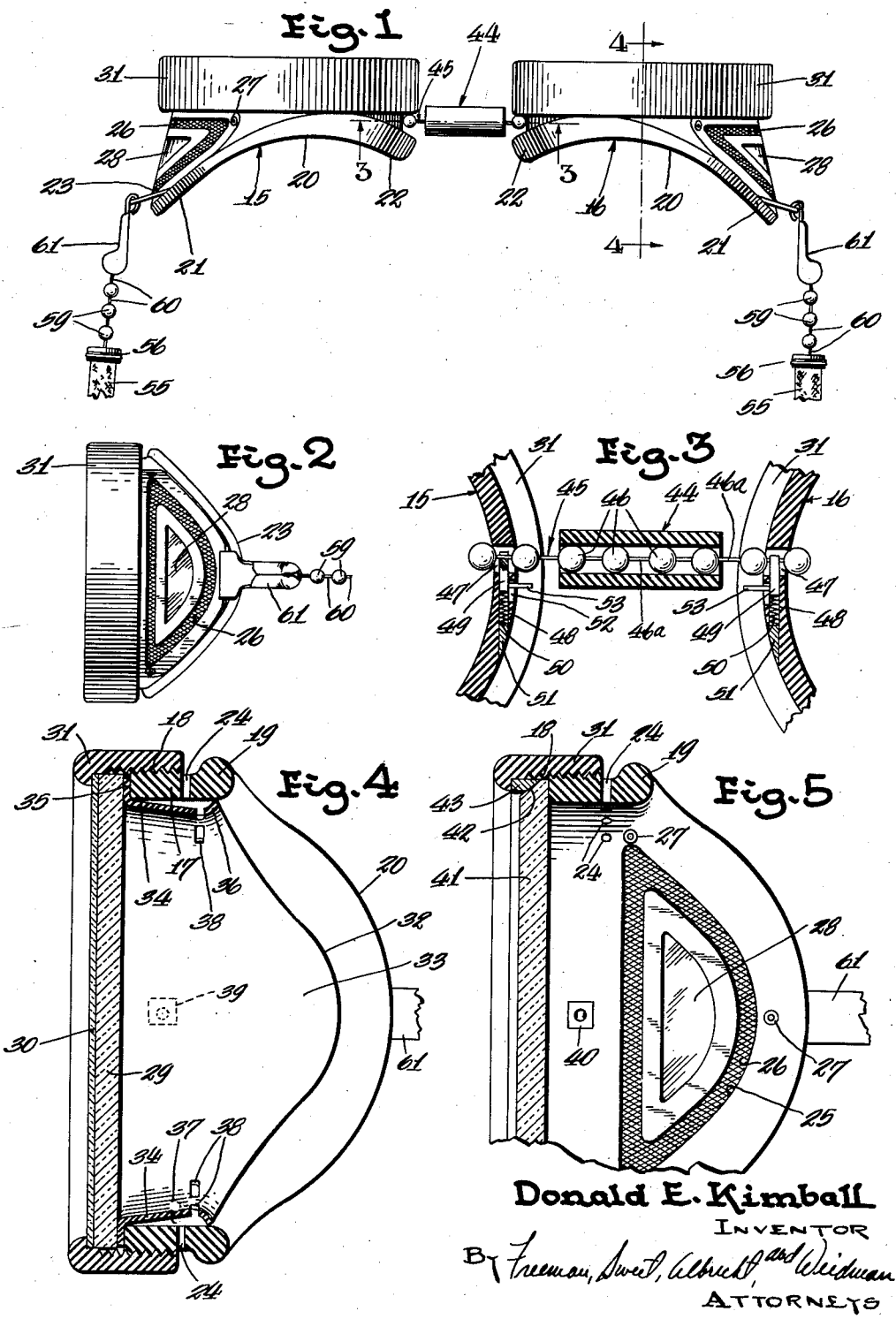

2,195,175

UNITED STATES PATENT OFFICE 2,195,175

EYE PROTECTOR

Donald E. Kimball, Cleveland, Ohio, assignor to Bausch & Lomb Optical Company, Rochester, N. Y., a corporation of New York Application May 18, 1937, Serial No. 143,307

4 Claims. (Cl. 2—14)

This invention relates to eye protectors, more particularly safety goggles, such as those used by industrial workers, and others, for protecting the eyes, and has for an object the provision of eye protectors of this type which are adequately ventilated, readily convertible from a light-excluding, to a light-admitting improved vision type, and in which adjustments in fastenings for the goggles to accommodate the same to different users, are readily made.

In the drawings accompanying this specification and forming a part of this application, I have shown, for purposes of illustration, embodiments which my invention may assume, and in the drawings:

Figure 1 is a top plan view of the goggles, a portion of the head band being broken away to better accommodate the view to the sheet, Figure 2 is a side elevational view of one of the goggle cups, showing a fragment of the head band connected thereto.

Figure 3 is an enlarged fragmentary, horizontal sectional view, corresponding substantially to the line 3—3 of Figure 1, Figure 4 is an enlarged, vertical sectional view, corresponding substantially to the line 4—4 of Figure 1, Figure 5 is a view similar to Figure 4, showing conversion from the light-excluding type of Figure 4, to the light-admitting improved vision type, Figure 6 is an exploded, perspective view, of the eye cup parts, and the manner of assembly of the same, Figure 7 is a perspective view of a different embodiment of the invention, Figure 8 is a vertical sectional view through an eye cup, showing another embodiment of the invention, Figure 9 is a fragmentary view of the light-excluding guard shown in Figure 8, Figure 10 is a fragmentary vertical sectional view through the head band structure employed in connection with the invention, while Figure 11 is a transverse sectional view corresponding substantially to the line 11—11 of Figure 10.

As shown in the drawings (Figures 1 through 6, and 10 and 11), the eye protectors comprise a pair of eye cups 15 and 16, of identical construction, except for their opposite disposition. Each eye cup is preferably molded from a suitable moldable composition, and comprises a circular section 17, circumferentially threaded on the exterior, as at 18, and integrally connected with a rear section 19, having a curved contour 20 to fit the face of a user, the temporal portion 21 being of greater length than the nose portion 22, and outwardly flared toward the rear, as at 23. a plurality of ventilating openings 24 being provided at the top and bottom in the rear of the threaded portion 18 of the circular section, as best shown in Figure 6. The flared portion 23 is provided with an aperture 25, closed by a screen 26, secured within the aperture 25 by any suitable securing means, as at 27. The screen 26 is cut out to form an opening of any desired shape, and the opening thus formed is covered by a piece of suitably shaped clear glass 28, secured in position by any suitable means. In some cases I may cover the aperture 25 by a continuous piece of clear glass, but I prefer to employ the screen and glass structure described, because of the additional ventilation obtained through the screen 26. By providing the glass insert, unobstructed vision may be had by the user from the side of the goggle, overcoming an objectionable defect present in goggles as hitherto existing.

In the construction shown, particularly in Figures 4 and 6, the goggle is intended for use as a welding goggle, from the interior of which light must be excluded. Under these circumstances the lens 29 will be dark colored, and preferably used in conjunction with a second lens 30, these lenses serving to exclude light rays harmful to the eyes. The lenses 29 and 30 are accommodated within a shouldered ring 31, interiorly threaded to engage the thread 18 of the circular section 17, and the shouldered ring, when fully threaded home, will detachably hold the lenses 29 and 30 in proper position with respect to the eye cup.

When used as a welding goggle, or in any case where light must be excluded, it is necessary to screen the ventilating openings 24, as well as the glass insert 28 and the screen 26. For this purpose I employ a detachable guard or shield 32, preferably molded from Bakelite, or other suitable material, having a flared portion 33 adapted to fit tightly against the inner surface of the flared portion 23 of the eye cup and overlie the glass insert 28 and screen 26, and arcuate extensions 34 to overlie the ventilating openings 24. The shield 32 has a flange 35 adapted to be clamped between the inner surface of the lens 29 and the adjacent edge of the circular section 17, as best shown in Figure 4, and along the rear edge of each arcuate section 34 a spacing flange 36 is formed, adapted to space the wall of the shield from the adjacent interior surface of the eye cup, to provide a ventilating space 37, the flange 36 being omitted along the flared section so that this section fits tightly against the wall of the eye cup. The shield 32 is also provided with a row of ventilating openings 38 which are offset with respect to the ventilating openings 24, so that air is admitted while light is excluded.

For detachably securing the shield 32 in position in its eye cup I provide the shield with a plurality of male snap fasteners 39, and the eye cup with cooperating female snap fasteners 40, the fasteners 39 and 40 in each case preferably being molded in the material of which the shield 32 and the eye cup is made. As shown in Figure 6 the lenses 29 and 30 first may be placed within the shouldered ring 31, the shield 32 inserted from the front of the eye cup, and the fasteners 39 and 40 engaged, after which the shouldered ring is screwed home in the manner disclosed in Figure 4.

To convert the goggle (Figure 5) into one in which light has free access, not only through the ring 31, but through the clear glass 28, and additional ventilation through the screen 26, the ring 31 is threaded off, the lenses 29 and 30 removed, the shield 32 removed, and a clear lens 41 substituted, usually with a beveled edge as at 42, a gasket 43 being employed to take up an equal amount of space as the lenses 29 and 30, so that the ring 31 when again screwed home will be in proper position.

The eye cups 15 and 16 are secured together by a nose piece 44, which comprises a chain member 45, covered by a piece of rubber tubing, the chain member 45 being made up of a series of spaced balls 46, swiveled on connecting bars 46a, each end of the chain member 45 taking through an aperture 47 formed in each eye cup at a point in the rear of the ring 31. For adjustably securing the related end of the chain member 45 in each eye cup, the eye cup is provided with a tangential bore 48 in which is reciprocably mounted a pin 49, adapted to extend between the balls 46, the pin 49 being urged toward engaging position by a coiled spring 50, which in turn is held in the bore by a plug 51. A slot 52 communicates with the bore 48, and in this slot works a finger-piece 53 threaded into the pin 49.

By this arrangement the distance between the two eye cups may readily be adjusted, it being necessary only to retract the pin 49 by withdrawing the finger-piece 53, shifting one or more balls 46 of the chain 45 in the desired direction for lengthening or shortening the distance between the eye cups, and when the desired adjustment is obtained, allowing the pin 49 to return to engagement, so as to hold the chain member 45 against detachment. Each of the eye cups is provided with a like pin arrangement as will be understood.

For supporting the goggles in position upon the head of a user a head band of a particular character is provided (Figures 1, 2, 10, and 11). As shown in Figures 10 and 11 a coiled spring 54 of small diameter and of the desired strength, is encased in a fabric sleeve 55, and to the ends of the sleeve 55 are secured ferrules 56, each having slots 56a through which portions of the sleeve ends extend, being secured by slip rings 56b. Each of the ferrules 56 is so constructed as to have one end of the coiled spring 54 secured thereto by any suitable means, the end of the coiled spring 54 being shown as held by a crimped portion of the ferrule, and having a straight extension 57 with its free end secured in the crimped portion of the ferrule, while its intermediate portion extends across an aperture 58 in the ferrule 56. The aperture 58 is adapted for the accommodation of a chain made up of spaced balls 59 and links 60, one or more of the balls being inserted through the aperture 58 depending upon the adjustment desired, these balls being slightly smaller than the aperture 58 and forced past the intermediate portion of the spring extension 57, the spring extension yielding upon entry of the balls, but resiliently returning to position behind the ball to prevent accidental withdrawal. The opposite end of the chain is fixedly secured to an anchor 61, hinged to the rear end of the flaring portion 23 of the goggle cup. When the head band is applied to the head of the user the spring 54, being readily extensible, is stretched, this action being permitted by the extensible fabric sleeve, and should additional adjustment be necessary the chain is inserted or withdrawn with respect to the end of the band as already described.

Referring now to Figure 7 a fragment of an eye cup 62 is shown, being identical in every way to the eye cup already described, except for omission of the snap fasteners 40. In place of the snap fasteners, a forward edge of the eye cup is provided with a plurality of spaced bayonet slots 63, only one of which is shown in Figure 7, and the shield or guard 64, similar to the shield 32, is provided with pins 65 in corresponding locations, so that the shield or guard 64 may have the pins 65 engaged within the bayonet slots 63, and rotated to secure the shield 64 in position. Otherwise the construction shown in Figure 7 is the same as that already described.

In Figure 8 still another embodiment is shown for detachably securing the shield or guard in position. The eye cup 66 is provided with a pin 67 and a pair of slots 68, while the shield 69 has an opening for the reception of the pin 67, and turned ends 70 which may be snapped into the slots 68 for detachably securing the shield in position in the eye cup. Except for the different type of mounting for the shield, the construction shown in Figure 8 is identical to that heretofore described.

From the above described construction it will be apparent that I have provided a convertible type of goggles, wherein in one form, a shield is secured in position, and dark colored lens employed, effectually excluding light from the interior of the eye cup, at the same time providing for adequate ventilation. With the forms of fastening means employed to secure the shield in place, it is possible to unscrew the lens holding ring, and clean the lens, without disturbing the shield, the shield remaining secure against accidental detachment. When exclusion of light is not necessary, it is possible by removing the shield and substituting a clear lens in place of the light-excluding lens, to obtain not only clear vision through the lens retaining ring, but unobstructed vision out to the sides of the goggles, and ventilation is increased by provision of the screen which carries the clear glass window.

Additionally it may be pointed out that the length of the nose piece may readily be adjusted without the necessity for unscrewing the lens carrying rings, the adjustment being made entirely from the exterior of the goggles while entirely assembled.

Finally by provision of a novel type of head band a large range of extensibility is provided for, the head band being very light in weight, and the ends of the same may readily be adjusted with reference to the goggles.

It will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. A convertible eye protecting device comprising: tubular housing means having detachable lens carrying means at one end adapted to accommodate either light-admitting or darkened lenses, depending upon whether it is desired to exclude or admit light, and the opposite end contoured to fit the face adjacent the eye socket, said housing having a light-admitting opening in the side wall thereof; a shield overlying the interior of said side wall to close said opening and exclude light when said dark lens is used; and snap fastener means for detachably fastening said shield in position with reference to said housing, whereby said shield may be removed when a light-admitting lens is employed.

2. An eye protective device, comprising: tubular housing means having a viewing lens in one end, and the opposite end contoured to fit the face of the wearer about the eye socket, said tubular housing means having an opening in its side wall; closure means spanning said side wall opening, said means normally admitting light rays to the interior of said tubular housing means; and light intercepting means contoured to fit said tubular housing means, constructed and arranged to shut out the passage of light rays through said side wall opening and into the interior of said tubular housing means; said housing mens and said intercepting means having quickly detachable complemental fastenings, including snap fasteners of the glove fastening type.

3. An eye protective device, comprising: tubular housing means having a viewing lens in one end, and the opposite end contoured to fit the face of the wearer about the eye socket, said tubular housing means having an opening in its side wall; closure means spanning said side wall opening, said means normally admitting light rays to the interior of said tubular housing means; and light intercepting means constructed and arranged to shut out the passage of light rays through said side wall opening and into the interior of said tubular housing means; said housing means and said intercepting means having spaced cooperable projecting means and socket means, and said intercepting means being somewhat resiliently flexible to facilitate application and holding after application of said projecting means and socket means.

4. An eye protective device, comprising: tubular housing means having a viewing lens in one end, and the opposite end contoured to fit the face of the wearer about the eye socket, said tubular housing means having an opening in its side wall; closure means spanning said side wall opening, said means normally admitting light rays to the interior of said tubular housing means; and light intercepting means contoured to fit said tubular housing means, constructed and arranged to shut out the passage of light rays through said side wall opening and into the interior of said tubular housing means; said housing means, and said intercepting means, having quickly detachable complemental fastenings, including bayonet joint connecting means.

DONALD E. KIMBALL.